United States Patent [19]

Arvidsson

[11] Patent Number: 4,818,033
[45] Date of Patent: Apr. 4, 1989

[54] DEVICE FOR PREVENTING A WHEEL CAP FROM LOOSENING FROM A RIM

[76] Inventor: Krister E. G. Arvidsson, Slagstavagen 7A, S-633 47 Eskilstuna, Sweden

[21] Appl. No.: 78,777
[22] Filed: Jul. 28, 1987
[51] Int. Cl.$^4$ .............................................. B60B 7/06
[52] U.S. Cl. .............................. 301/37 CD; 301/37 R
[58] Field of Search ............. 301/37 R, 37 CD, 37 C, 301/37 PB, 37 TP, 37 T, 37 B

[56] References Cited

U.S. PATENT DOCUMENTS

| 4,171,149 | 10/1979 | Marks et al. | 301/379 R |
| 4,218,099 | 8/1980 | Bayman et al. | 301/37 R |
| 4,363,520 | 12/1982 | Connell | 301/79 PB X |

FOREIGN PATENT DOCUMENTS

| 3319229 | 11/1984 | Fed. Rep. of Germany | 301/37 CD |

*Primary Examiner*—Robert B. Reeves
*Assistant Examiner*—Frank H. Williams, Jr.
*Attorney, Agent, or Firm*—Tarolli, Sundheim & Covell

[57] ABSTRACT

The present invention relates to a device for preventing a wheel cap from loosening from a rim, whereby the wheel cap is mounted on a ring member which is insertable into the rim and provided with a plurality of anchoring members of resilient material that are hooked onto said ring member and include hook portions adapted to hook into a ring-shaped recess in the rim when the ring member is brought therein. To prevent that the ring member and the wheel cap may loosen from the rim when the wheel cap and/or the ring member bump into any obstruction, e.g. a road curbstone, a distance between inwardly directed portions of each of a pair of opposed anchoring members on the ring member and the inwardly directed portion of the rim is so chosen, when the ring member is in a normal position relative to the rim, that the inwardly directed portion of one of the anchoring members hits the inwardly directed portion of the rim before the hook portion of the other anchoring member loosens from the annular recess of the rim when the ring member is displaced from its normal position relative to the rim by the wheel cap and/or the ring member bumping into an obstruction when the vehicle rolls on a support. The ring member has an inwardly directed portion having a convexly shaped radial cross-section. The axially inwardly directed portion of an anchoring member which is substantially linear, overlies the inwardly directed portion of the ring member and bends thereover when the anchoring member is hooked onto the ring member.

4 Claims, 4 Drawing Sheets

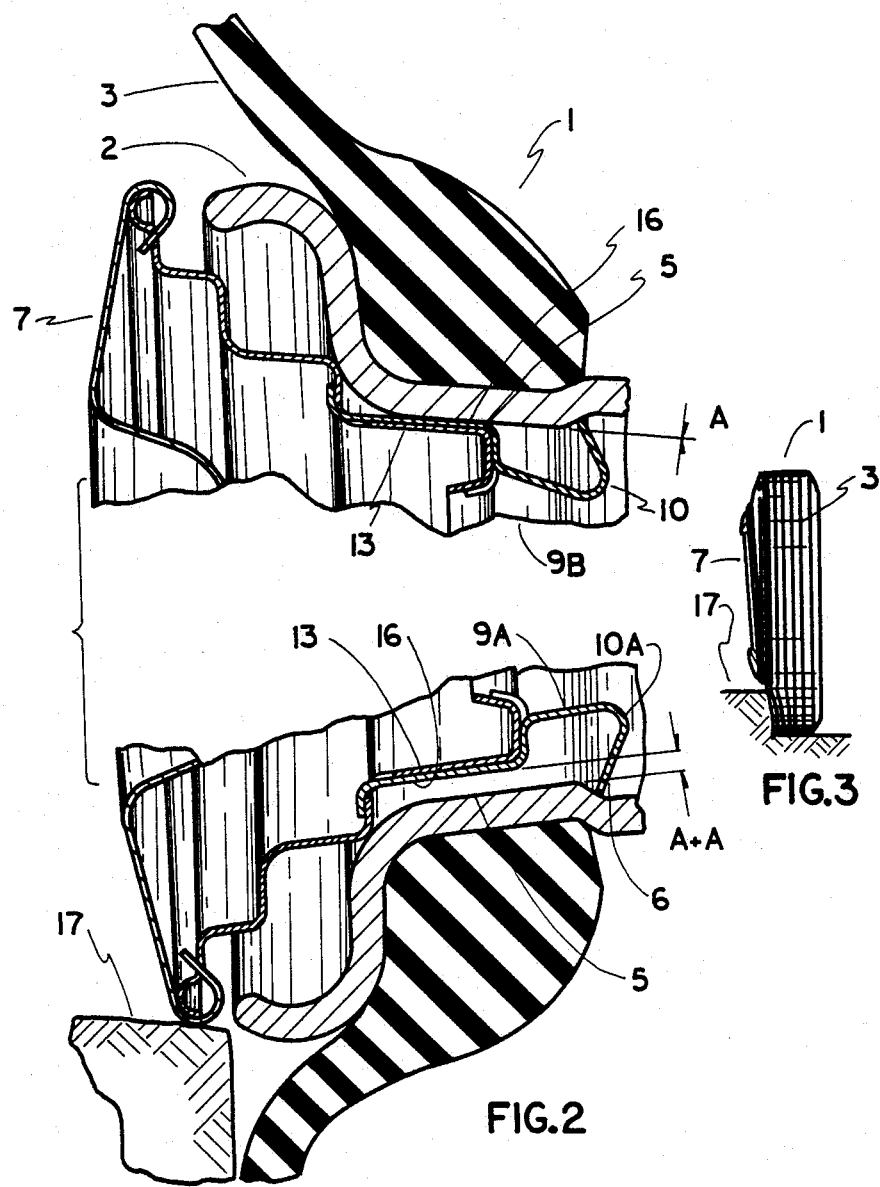

DEVICE FOR PREVENTING A WHEEL CAP FROM LOOSENING FROM A RIM

BACKGROUND AND SUMMARY OF THE INVENTION

The present invention relates to a device for preventing a wheel cap from loosening from a rim, whereby the wheel cap is mounted on a ring member which is insertable into the rim and is provided with a plurality of anchoring members of resilient material that are hooked into the ring member and include hook portions adapted to hook into a ring-shaped recess in the rim when the ring member is brought therein, whereby the ring member includes a contact portion adapted to engage an outer rim portion of the rim, and an inwardly directed portion within the contact portion adapted to extend along an inwardly directed rim portion positioned between the outer rim portion and the annular recess of the rim, and whereby each anchoring member includes an outer mounting portion which is insertable into an opening in the ring member, and an inwardly directed portion positioned between the mounting portion and a hook portion and adapted to lie between the inwardly directed portions of the ring member and the rim respectively, when the ring member with the wheel cap is hooked onto the rim via the anchoring members.

Devices of the abovementioned type are already known from DE No. 33 19 229 A1 and these prior art devices retain the wheel cap at the rim with a firm grip as long as the wheel cap and/or the ring member on which the wheel cap is fixed does not bump into any obstruction. However, should the wheel cap and/or the ring member bump into any obstruction, e.g. a road curbstone if the vehicle is driven too close thereto, there is a risk that the wheel cap and/or the ring member will be lifted relative to the rim, whereby the anchoring member(s) located immediately below in the rim will be lifted out of the recess of the ring member. This may result in that the ring member and wheel cap loosen from the rim, which is unacceptable.

The object of the present invention is to eliminate this problem and provide a simple device which effectively prevents the wheel cap and/or the ring member from loosening when these members bump into an obstruction. This is arrived at according to the invention by means of the characterizing features of claim 1.

BRIEF DESCRIPTION OF THE DRAWINGS

In the following there will be described an embodiment of the invention with reference to the accompanying drawings, in which:

FIG. 2 is a section through lower and upper portions of the rim with a device according to the invention in a position wherein it bumps into an obstruction;

FIG. 3 is a front view of a vehicle wheel when the wheel cap and the ring member thereof below bump into an obstruction in the form of a road curbstone;

DESCRIPTION OF THE PREFERRED EMBODIMENT

Figure 1:
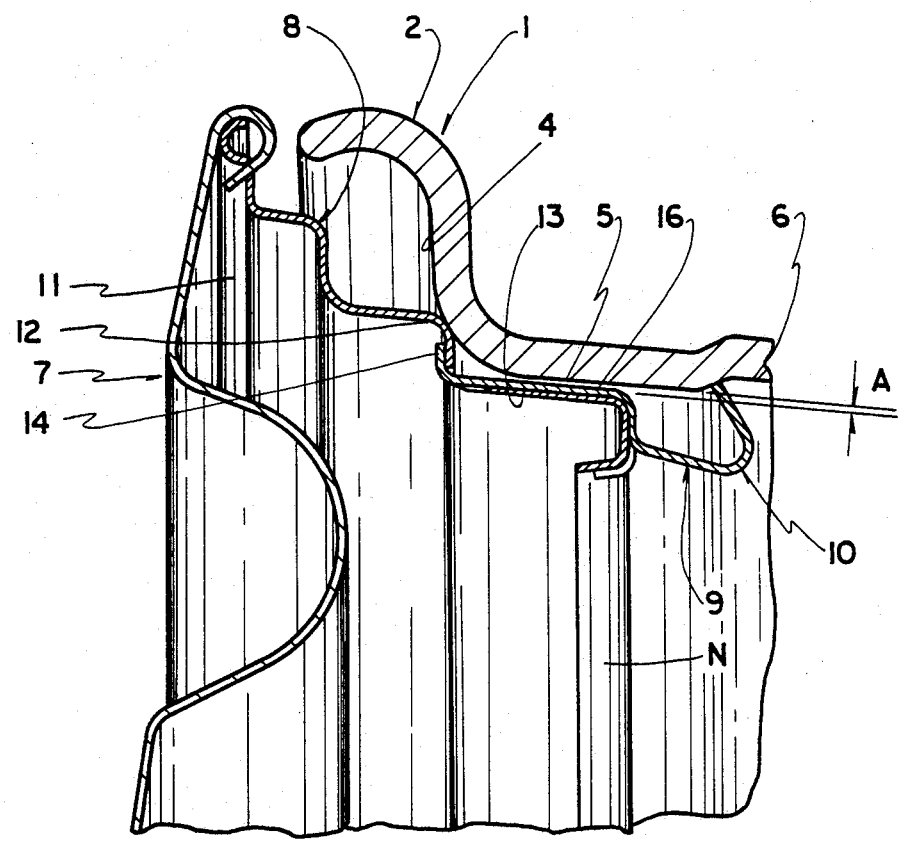
FIG. 1 is a section through a portion of a rim with a portion of a device according to the invention anchored thereto, in a normal position.

In the drawings there is illustrated a vehicle wheel 1 comprising a rim 2 and a tire 3 mounted thereon. The rim 2 includes an outer rim portion 4 and an inwardly directed rim portion 5 positioned between the outer rim portion 4 and a ring-shaped recess 6.

A wheel cap 7 is fixed on the rim 2 by means of a ring member 8 and a plurality of anchoring members 9 hooked onto the ring member and adapted to hook into the recess 6 of the rim 2 via hook portions 10 when the ring member 8 is inserted into the rim.

The ring member 8 includes an outer part 11 on which the wheel cap 7 is mounted. Within said outer part 11, the ring member 8 has a contact portion 12 adapted to engage the outer rim portion 4 of the rim 2. Within the contact portion 12, the ring member further includes an inwardly directed portion 13 adapted to extend along the inwardly directed rim portion 5.

Each anchoring member 9 includes an outer mounting portion 14 which is insertable into an opening 15. Each anchoring member 9 also includes an inwardly directed portion 16 positioned between the mounting portion 14 and the hook portion 10 and adapted to lie between the inwardly directed portions 13, 5 of the ring member 8 and rim 2 respectively, when said ring member with wheel cap 7 is fixed or hooked onto said rim via the anchoring members 9.

The ring member 8 is insertable into the rim 2 and the anchoring members 9 consist of resilient material, such that they may yield when the ring member 8 is inserted into the rim 2. When the hook portions 10 of the anchoring members 9 reach the ring-shaped recess 6 of the rim 2, they spring out therein with their hook portions 10 and hold the ring member in a normal position N relative to the rim 2. In this normal position, the distance between the inwardly directed portions 13, 5 of the ring member 8 and rim 2 respectively, is substantially the same around the entire rim.

The ring member 8 is provided with a suitable number of pairs of anchoring members 9, whereby one anchoring member 9a in each pair is disposed opposite to the other anchoring member 9b in the same pair.

In order to prevent the hook portion (10a in FIG. 2) of one of the anchoring members (9a in FIG. 2) from loosening from the recess 6 of the rim 2 when the ring member 8 is displaced from its normal position N by the wheel cap 7 and for the ring member 8 bumping into an obstruction 17, e.g. a road curbstone, while the vehicle wheel 1 rolls on the ground or other support, the distance A between the inwardly directed portions 16, 5 of the anchoring members 9a, 9b and rim 2, respectively, when the ring member 8 is in its normal position N (FIG. 1), is chosen such that the inwardly directed portion (16b in FIG. 2) of one of the anchoring members (9b in FIG. 2) hits the inwardly directed portion 5 of the rim 2 before the hook portion (10a in FIG. 2) of the other anchoring member (9a in FIG. 2) loosens from the ring-shaped or annular recess 6 of the rim 2. As is evident from FIG. 2 the inwardly directed portion 16 of the anchoring member 9b engages the rim 2 (i.e. A=O), while the inwardly directed portion 16 of anchoring member 9a is at its maximum distance (A+A) from the rim 2 without the hook portion 10a leaving the recess 6.

While each pair of anchoring members 9a, 9b cooperates in this way, they retain the ring member 8 at the rim 2 even if the wheel cap 7 and/or the ring member 8 bump into any obstruction 17 and this is true irrespective of whether the wheel cap 7 and/or the ring member 8 bump into the obstruction 17 from above (as in FIGS. 2 and 3) or from any side.

By the very fact that the cap 7 and/or the ring member 8 leave contact with the obstruction 17, the anchoring members 9, due to their resilient properties, reset the ring member 8 to its normal position N substantially centered with the rim 2.

The inwardly directed portion 16 of each anchoring member 9 is adapted to engage the inwardly directed portion 13 of the ring member 8 and within said inwardly directed portions 16, each anchoring member 9 has an inner fixing portion 19 which is adapted to be hooked onto an inner hook portion 20 of the ring member 8.

Figure 4:
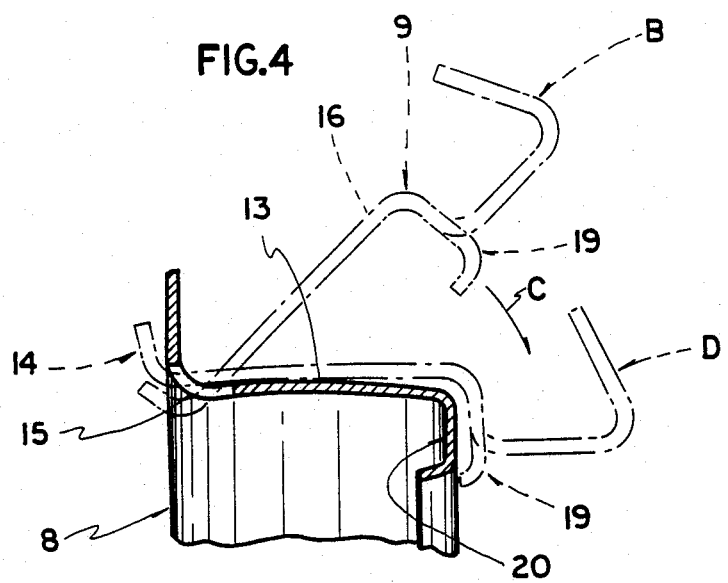
FIG. 4 is a section through a portion of a ring member forming part of the device according to the invention and an anchoring member in various positions during clamping thereof onto said ring member.
Figure 5:
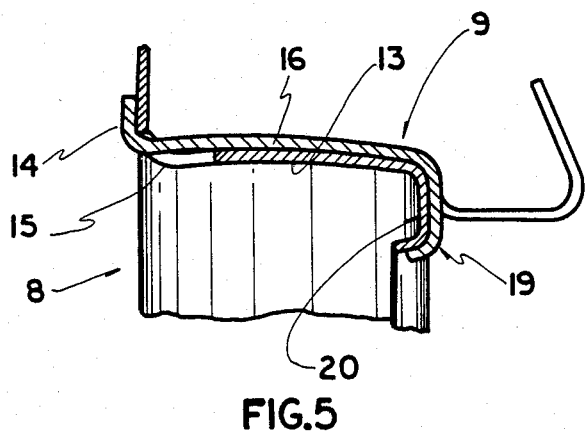
FIG. 5 illustrates the position of the anchoring member after mounting thereof on the ring member.

In order to make sure that each anchoring member is rigidly mounted on the ring member 8, the inwardly directed portion 13 of the ring member is convexly shaped or has a convexly curved outer side, while the inwardly directed portion 16 of each anchoring member 9 is substantially linear. This design of the anchoring members 9 and the ring member 8 means that when the outer mounting portion 14 of the anchoring member 9 has been inserted into the opening 15 of the ring member (position B in FIG. 4), has been moved towards the ring member (according to arrow C in FIG. 4) and has reached said ring member (position D in FIG. 4), the inwardly directed straight portion 16 thereof must be bent such that its inner fixing portion 19 can be hooked onto the inner hook portion 20 of the ring member 8 (FIG. 5). Since the anchoring members 9 are made of resilient material and the inwardly directed portions 16 thereof will regain their original straight shape, said anchoring members 9 are now fixedly mounted or rather clamped onto the ring member 8.

Figure 6:
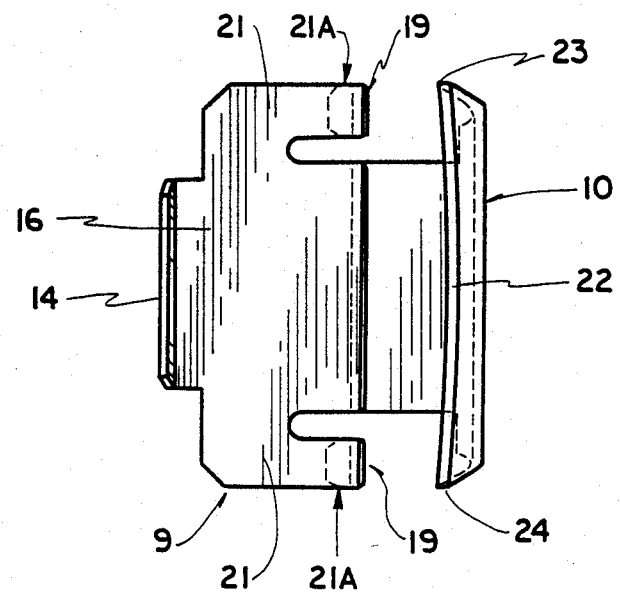
FIG. 6 is a plan view of the anchoring member.

The inner fixing portion 19 of each anchoring member 9 is preferably U-shaped and only through the end portion 21 of the shank 21a is connected to the inwardly directed portion 16. As is evident from FIG. 6, each anchoring member 9 has two such U-shaped inner fixing portions 19 provided on opposite sides of the inwardly directed portion 16. By providing the fixing portions 19 in this way, they yield resiliently relative to the inwardly directed position 16.

The hook portion 10 of each anchoring member 9 preferably has a concave end edge 22 (see FIG. 6) for providing two points 23 and 24 which may be hooked into the material of the rim 2 at its ring-shaped recess 6 such that the anchoring members 9 are more rigidly secured.

The invention is not limited to the embodiment shown in the drawings, but may vary within the scope of the following claims. Thus, the number of anchoring members 9 may vary and the shape thereof, as well as of the ring member, may differ without leading away from the primary object of the invention.

I claim:

1. A device for mounting a wheel cap on a rim of a vehicle wheel, said device comprising:
    a ring member for attaching the wheel cap to the vehicle rim, said ring member comprising:
    a ring portion for receiving the wheel cap thereon;
    a contact portion for engaging an axially outer portion of the rim,
    an inwardly directed portion extending from said contact portion and along an axially inwardly directed portion of the rim extending between the axially outer portion of the rim and an annular recess formed in the rim,
    at least a pair of openings located between said contact portion and said inwardly directed portion of said ring member, and
    a ring hook portion connected to said inwardly directed portion of said ring member; and
    at least a pair of opposed anchoring members made of a resilient material for attaching said ring member to the wheel rim, each of said opposed anchoring members comprising:
    an outer mounting portion extendable through a respective opening in said ring member,
    an axially inwardly directed portion extending from said outer mounting portion for location between said inwardly directed portion of said ring member and the axially inwardly directed portion of the rim when said ring member is attached to the rim,
    a hook portion connected to said axially inwardly directed portion of the anchoring member for location in the annular recess of the rim when the wheel cap is attached to the rim, and
    at least one inner fixing portion for hooking onto said ring hook portion to secure the anchoring member with said ring member;
    the distance between axially inwardly directed portions of respective opposite anchoring members and the adjacent axially inwardly directed portion of the rim, when said anchoring members attach said ring member to the rim, is so selected that a respective axially inwardly directed portion of a respective anchoring member engages the axially inwardly directed portion of the rim before the hook portion of the other of said anchoring members is displaced from the annular recess of the rim when said ring member is displaced from its normal position relative to the rim by the wheel cap and/or the ring member hitting an obstruction during movement of the vehicle; and
    said inwardly directed portion of said ring member having a convexly shaped radial cross-section and said axially inwardly directed portion of said anchoring member being substantially linear whereby said axially inwardly directed portion of said anchoring member bends over said convexly shaped axially inwardly directed portion of said ring member when said one inner fixing portion of the anchoring member hooks onto said ring hook portion to secure said anchoring member to said ring member.

2. A device according to claim 1 wherein said inner fixing portion of each anchoring member is U-shaped and comprises a shank portion having an end portion for resiliently connecting said inner fixing portion to said inwardly directed portion of the anchoring member.

3. A device according to claim 1 wherein said hook portion of each anchoring member comprises a concave end edge having two points for engaging into the material of the rim.

4. A device for mounting a wheel cap on a rim of a vehicle wheel, said device comprising:
    a ring member for attaching the wheel cap to the vehicle rim, said ring member comprising:
    a ring portion for receiving the wheel cap thereon;

a contact portion for engaging an axially outer portion of the rim, an inwardly directed portion extending from said contact portion and along an axially inwardly directed portion of the rim extending between the axially outer portion of the rim annular recess formed in the rim, opening means located between said contact portion and said inwardly directed portion of said ring member, and a ring hook portion connected to said inwardly directed portion of said ring member; and at least a pair of opposed anchoring members made of a resilient material for attaching said ring member to the wheel rim, each of said opposite anchoring members comprising:

an outer mounting portion extendable through said opening means in said ring member, an axially inwardly directed portion extending from said outer mounting portion for location between said inwardly directed portion of said ring member and the axially inwardly directed portion of the rim when said ring member is attached to the rim, a hook portion connected to said axially inwardly directed portion of the anchoring member for location in the annular recess of the rim when the wheel cap is attached to the rim, and at least one inner fixing portion for hooking onto said ring hook portion to secure the anchoring member with said ring member;

means for preventing disengagement of the hook portions of said opposed anchoring members from the annular recess in the rim, said preventing means comprising respective surfaces of said axially inwardly directed portions of said anchoring members which respectively engage the axially inwardly directed portion of the rim before the respective hook portion of a respective anchoring member is disengaged from the rim annular recess; and said inwardly directed portion of said ring member having a convexly shaped radial cross-section and said axially inwardly directed portion of said anchoring member being substantially linear whereby said axially inwardly directed portion of said anchoring member bends over said convexly shaped axially inwardly directed portion of said ring member when said one inner fixing portion of the anchoring member hooks onto said ring hook portion to secure said anchoring member to said ring member.

* * * * *